(12) United States Patent
Fleischmann

(10) Patent No.: US 7,658,206 B2
(45) Date of Patent: Feb. 9, 2010

(54) PLUMBING VALVE WITH STICK CONTROL HANDLE

(75) Inventor: Gary A. Fleischmann, Mequon, WI (US)

(73) Assignee: Kohler Co., Kohler, WI (US)

( * ) Notice: Subject to any disclaimer, the term of this patent is extended or adjusted under 35 U.S.C. 154(b) by 213 days.

(21) Appl. No.: 11/633,856

(22) Filed: Dec. 5, 2006

(65) Prior Publication Data

US 2008/0128035 A1 Jun. 5, 2008

(51) Int. Cl.
*F16K 11/06* (2006.01)
(52) U.S. Cl. .................................. 137/625.4; 4/677
(58) Field of Classification Search ............ 137/625.17, 137/625.4, 625.41; 4/677
See application file for complete search history.

(56) References Cited

U.S. PATENT DOCUMENTS

| 1,798,530 | A | 3/1931 | Haigh |
| 2,850,042 | A | 9/1958 | Strazdins |
| 3,512,547 | A | 5/1970 | Gibbs et al. |
| 3,548,878 | A | 12/1970 | Brigandl |
| 3,667,503 | A * | 6/1972 | Farrell et al. ............ 137/625.4 |
| 3,693,660 | A | 9/1972 | Wheelock |
| 4,357,957 | A | 11/1982 | Bisonaya et al. |
| 4,916,966 | A | 4/1990 | Weishaupt et al. |
| 5,095,934 | A | 3/1992 | Iqbal |
| 6,209,581 | B1 | 4/2001 | Gyozo |
| 6,286,808 | B1 | 9/2001 | Slothower et al. |

FOREIGN PATENT DOCUMENTS

| DE | 30 41 696 A1 | 6/1982 |
| WO | PCT/US89/00275 | 1/1989 |
| WO | PCT/US2007/022156 | 10/2007 |

OTHER PUBLICATIONS

An Oct. 21, 2005 Elkay advertisement for their Arezzo faucet.
A 2006 Kohler advertisement for the Purist K-3092 cabinet with faucet, admitted prior art.

* cited by examiner

*Primary Examiner*—John Fox
(74) *Attorney, Agent, or Firm*—Quarles & Brady LLP

(57) ABSTRACT

Faucets are provided with joystick type control handles. The joysticks are provided with springs outside the main valve housing either between the joystick handle and lever stick, or between the joystick handle and an associated ball. In the latter case the ball retains a sliding disk.

6 Claims, 9 Drawing Sheets

PLUMBING VALVE WITH STICK CONTROL HANDLE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to plumbing valves such as faucets. More particularly it relates to such valves which are controlled by a joystick type handle control.

A wide variety of plumbing control valves are known which use a single lever handle to control volume and mixing. Typically the handle extends through the top or front of a valve housing with its inner end linked to sliding and/or rotating plates or other control structures. The outer end of the handle is designed to be gripped by the consumer. See e.g. U.S. Pat. Nos. 1,798,530, 2,850,042, 3,512,547, 3,548,878, 3,693,660, 4,357,957, 4,916,966, 5,095,934, 6,209,581 and 6,286,808.

However, a problem with many of these designs is that pressure on the control handle during actuation can eventually cause the handle connection to loosen, which can allow the handle to inadvertently actuate or wobble. Further, over time some of these devices require a relatively large force to cause movement of the valve components, which can expedite degradation of valve internal components. Even where this is not the case, many of these designs are undesirably susceptible to wear and tear.

Still other of these designs do not effectively preclude environmental water, soap and dirt from entering the valve. Again, this can adversely affect performance.

In other developments, there have been some attempts to provide such control handles which mimic the aesthetic appearance and feel of an aviation or video game joystick. However, existing prior art designs suffer from one or more deficiencies (e.g. those noted above).

In still other developments there have been attempts to mount faucets in hidden enclosures associated with lavatories. For example, Kohler Co. markets a Purist™ bathroom cabinet in which the outlet for its faucet is integrated inside the cabinet. However, that system uses a conventional control handle to control outlet flow.

Thus, a need still exists for improved single handle plumbing valves, particularly those which present a joystick-type feel and appearance and/or which are capable of being integrated into cabinets and other box-like housings.

SUMMARY OF THE INVENTION

In one aspect the present invention provides a faucet that has a housing, a first inlet port for supplying water to the faucet, an outlet port for delivering water from the faucet, a control valve suitable to control the flow of water from the inlet port to the outlet port, a lever linked to the control valve for controlling the control valve, a joystick handle linked to the lever so as to permit relative axial movement there between, and a biasing member positioned outside the housing between the lever and joystick so as to resiliently bias the joystick away from the control valve. Typically, there is also a second inlet port for supplying water to the faucet which has a different water temperature than water supplied to the first inlet port, wherein the control valve controls both volume of water delivered out the outlet port, and the mix of water delivered out the outlet port deriving from the first inlet port versus the second inlet port.

In preferred forms the joystick handle has a domed inward end which rides against a complementary recess in a cover element, the cover element has an essentially central aperture through which extends at least part of the domed end, and the lever has an inward end which has a ball.

Some embodiments of the invention are particularly suitable to be mounted in a box with the handle (and possibly a portion of an outlet nozzle) projecting out a front of the box. The box could be a compact counter top mounted box, or could be a cabinet having storage shelving.

In another aspect the invention provides a faucet which has a housing, a first inlet port for supplying water to the faucet, an outlet port for delivering water from the faucet, a control valve suitable to control the flow of water from the inlet port to the outlet port, a lever linked to the control valve for controlling the control valve, a joystick handle linked to the lever, a ball positioned along the lever for movement there along, and a biasing member positioned outside the housing between the ball and joystick so as to resiliently bias the ball towards the control valve. Again, these principles can be applied to a mixing valve with multiple inlets and a valve that controls both volume and water temperature.

In preferred forms there is a sliding disk between the ball and housing that slides as the lever is tilted, as well as a bearing positioned between the housing and sliding disk. Most preferably the bearing is formed of an acetal copolymer.

In other preferred forms there is a set screw axially fixing the lever to the joystick, the faucet is in the form of a lavatory spout suitable to be mounted on a counter top, and the ball has a cavity housing a coiled spring.

One important advantage of the present invention is that the spring provides a resilient loading to the joystick, or from the joystick. Further, when a sliding disk is used to cover the connection between the handle, the lever and the control valve, the disk can be provided with a self-lubricating bearing. In any event, it helps seal out water, debris and cleaning solutions.

The resiliency of the joystick connection also minimizes wear on the internal moving parts, while providing an aesthetically pleasing feel. Importantly, the location for a spring outside the main housing facilitates assembly and maintenance.

Another advantage of the resilient connection is that it reduces the likelihood of cracking the cabinet or other associated supporting box. For example, the associated mirror of the cabinet may be somewhat fragile. The extra give provided by the spring is an important safeguard in reducing excess pressure.

Yet another advantage of the present invention is that when these faucets are used with aesthetically pleasing cabinet and other box housings, with appropriate positioning of an outlet nozzle a user can only see the joystick control and an exiting water stream. Particularly where the nozzle creates a laminar flow, this creates a highly desirable aesthetic appearance.

These and still other advantages of the present invention will be apparent from the detailed description which follows and the accompanying drawings. Hence, the of the faucet. The sides 18 of the cabinet can be in the form of swing-out hide-away shelves.

Faucet 14 includes a front 20, which can be part of cabinet 16 (e.g. a mirrored front surface of cabinet 16) or can otherwise be part of a faucet housing. A outlet spout 22 is connected to the faucet 14, and a mixing valve cartridge 24 is in fluid communication with spout 22.

The precise mixing valve used is not critical provided that it can be controlled by joystick movement. For example, the mixing valve of U.S. Pat. No. 6,209,581, incorporated herein by reference, could be used to control water flow from hot and cold inlets to the outlet spout 22. Alternatively, one could select other commercial ceramic mixing valves such as the Kerox Model GN-40A, which is advertised to be suitable for use with joystick control.

In any event, the cartridge should be able to accept a conventional hot water inlet connection 26 and cold water inlet connection 28, and be connectible to a mixed water outlet tube 30. Further, the control disks or other structures of the valve should be suitable to be activated by pivoting (or other movement) of the stick lever 32. Further, in accordance with the present invention, a joystick type faucet handle 34 is then mounted to stick lever 32 (in this embodiment to permit relative axial movement there between).

A cover 42 is positioned between the joystick handle 34 and front 20, and a biasing element 38 (in the form of a spring) is positioned outside front 20 between joystick handle 34 and stick lever 32. Biasing element 38 biases handle 34 outward, and thus domed skirt 40 attached thereto against a corresponding recess in cover 42. following claims should be looked to in judging the full scope of the invention.

DETAILED DESCRIPTION OF THE PREFERRED EMBODIMENTS

Figure 1:
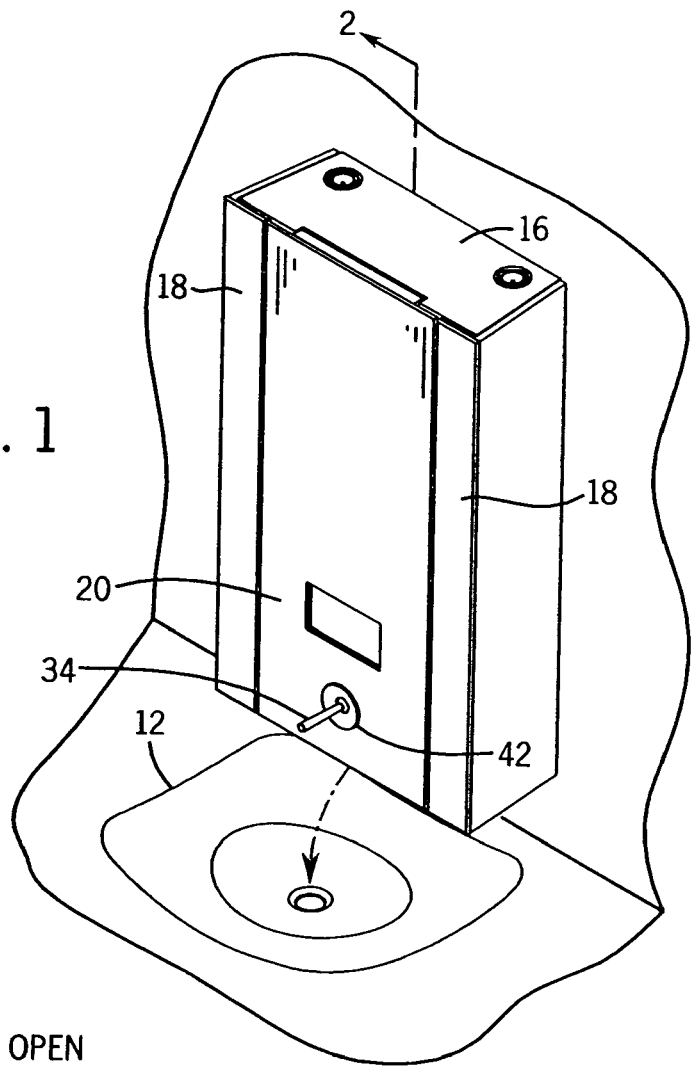
FIG. 1 is a perspective view of a bathroom storage cabinet and adjacent lavatory, where a plumbing valve of the present invention has been integrated therewith.
Figure 5:
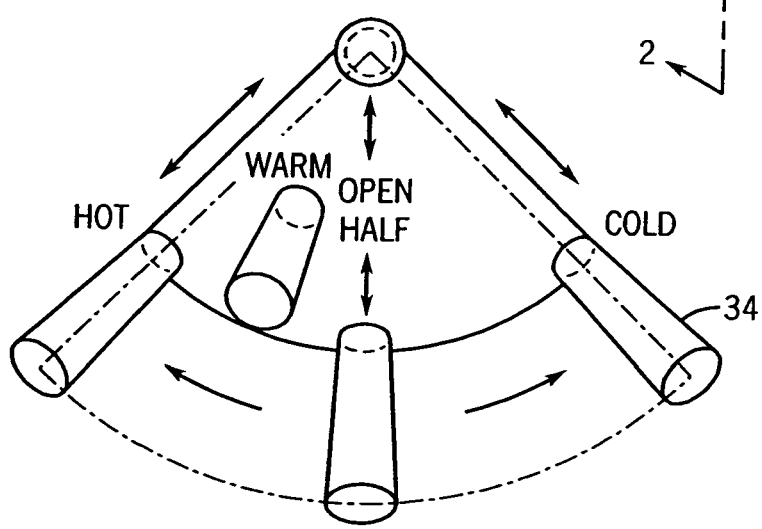
FIG. 5 is a schematic illustration of how a joystick of the present invention controls water flow and temperature.
Figure 2:
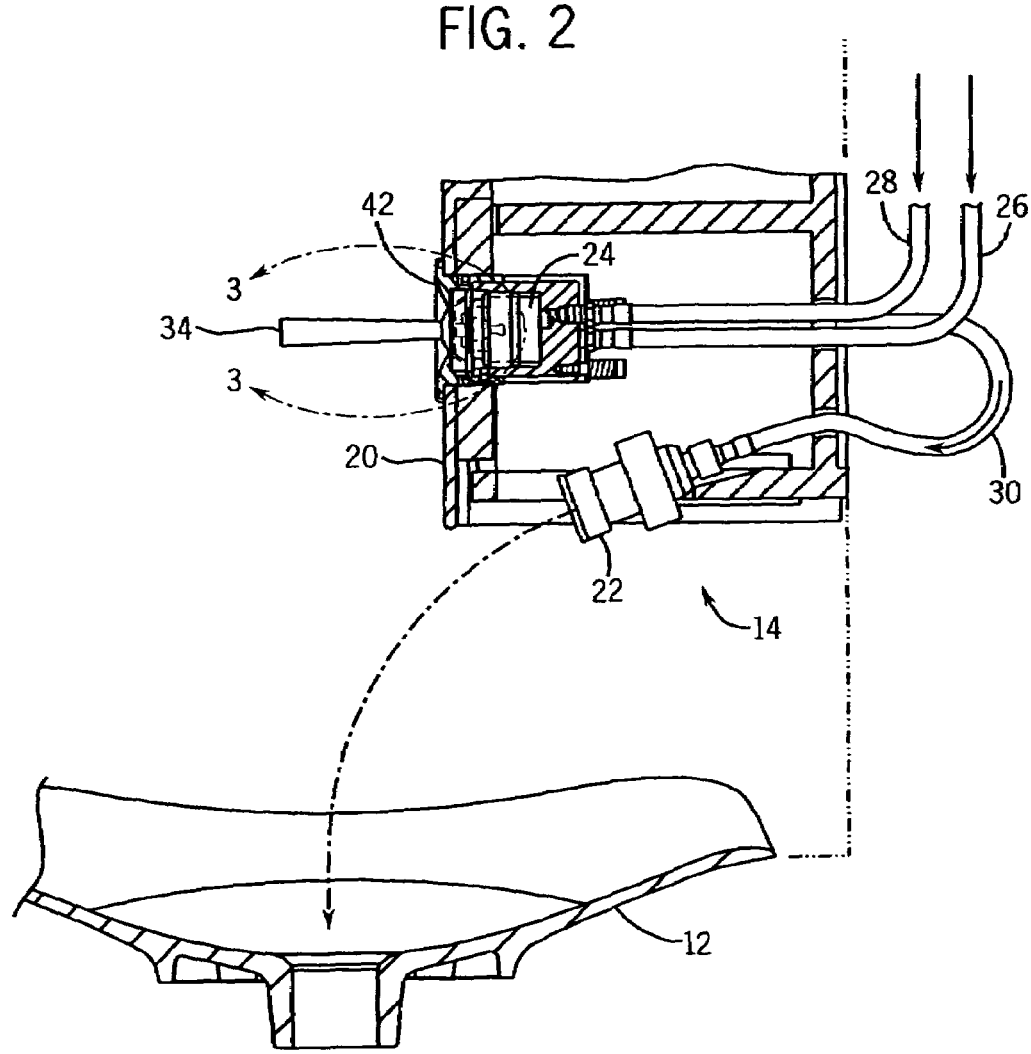
FIG. 2 is a fragmentary cross-sectional view taken generally along line 2-2 of FIG. 1.
Figure 3:
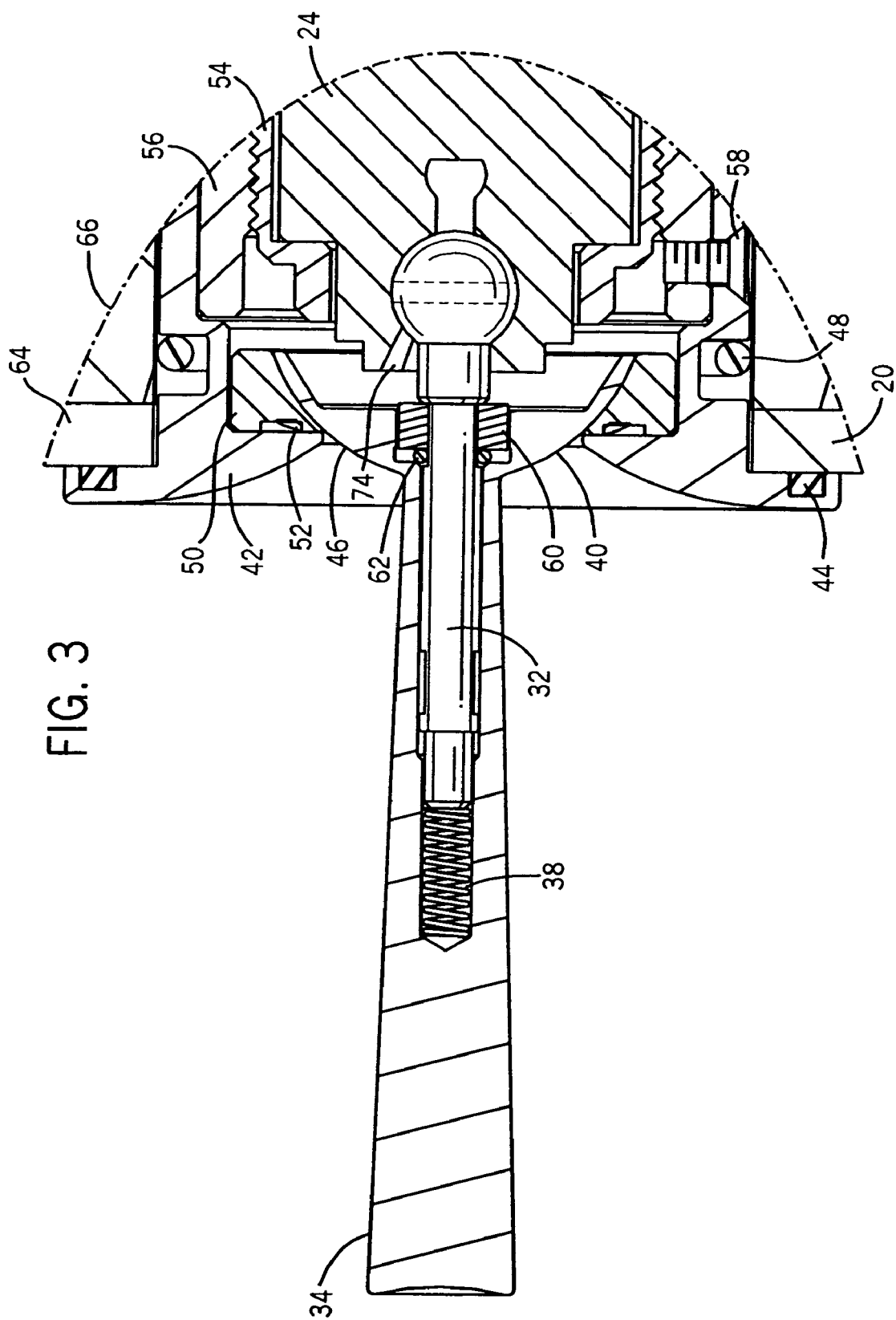
FIG. 3 is an enlarged sectional view of detail portion 3-3 of FIG. 2.

Referring first to FIGS. 1-6, there is shown a sink 12 and a cabinet 16 having a faucet 14 associated therewith. The internal central portion of the cabinet 16 can contain plumbing connections and most of the parts Biasing element 38 is shown as a coil spring. However, other biasing structures are possible such as leaf springs, spring washers, elastomeric materials, and other resilient compressible elements such as a gas diaphragm.

There is also a gasket 44 between front 20 and cover 42. Cover 42 also includes an approximately central aperture 46 through which extends at least part of domed skirt 40.

Other elements include O-ring 48, collar 50, spring washer 52, and nut 54. Nut 54 is threadably engaged with casing 56 to provide an outer limit for mixing valve cartridge 24, among other things, and screws 58 fix cover 42 to casing 56.

Split nut 60 provides an inside limit for handle 34. O-ring 62 reduces or eliminates any wobble in handle 34 and provides the user with a more positive control. Casing 56 can also include couplings (not shown) which connects inlet connections 26 and 28, and outlet tube 30, to corresponding ports on mixing valve cartridge 24.

Figure 6:
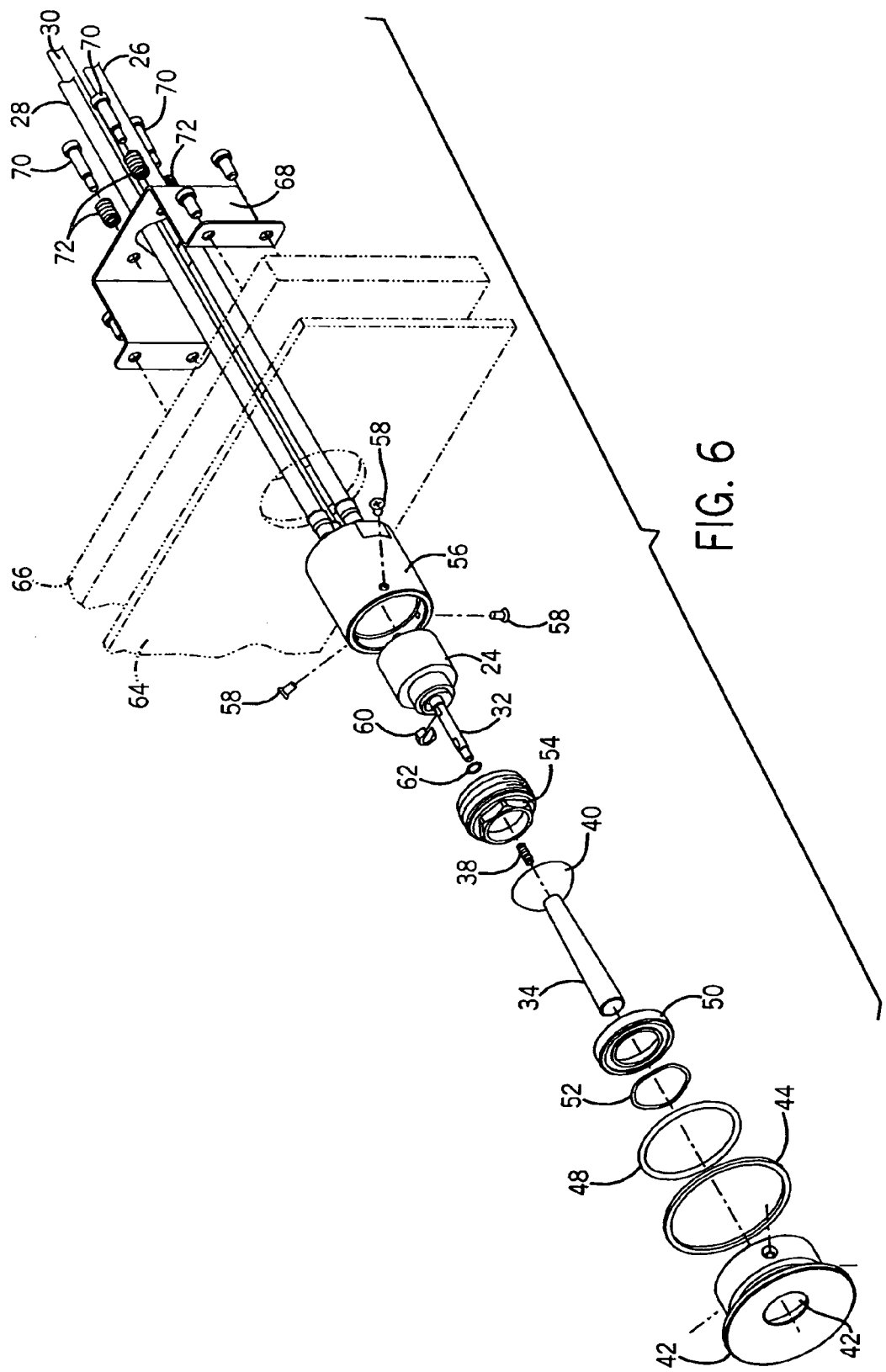
FIG. 6 is an exploded perspective view of the FIG. 4 faucet, excluding the spout.
Figure 7:
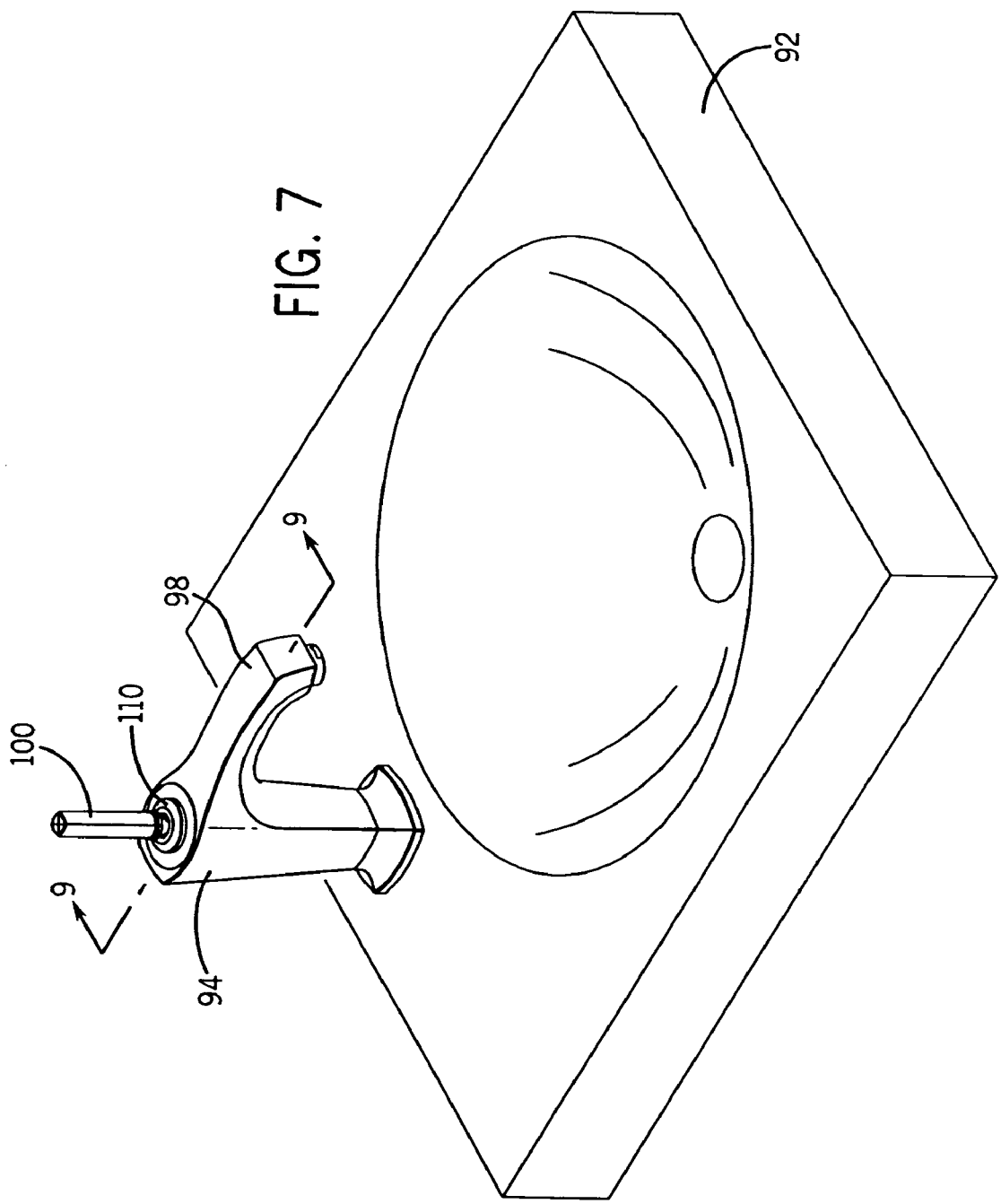
FIG. 7 a perspective view of a third embodiment, in the form of a faucet with a joystick control, positioned adjacent a lavatory.
Figure 8:
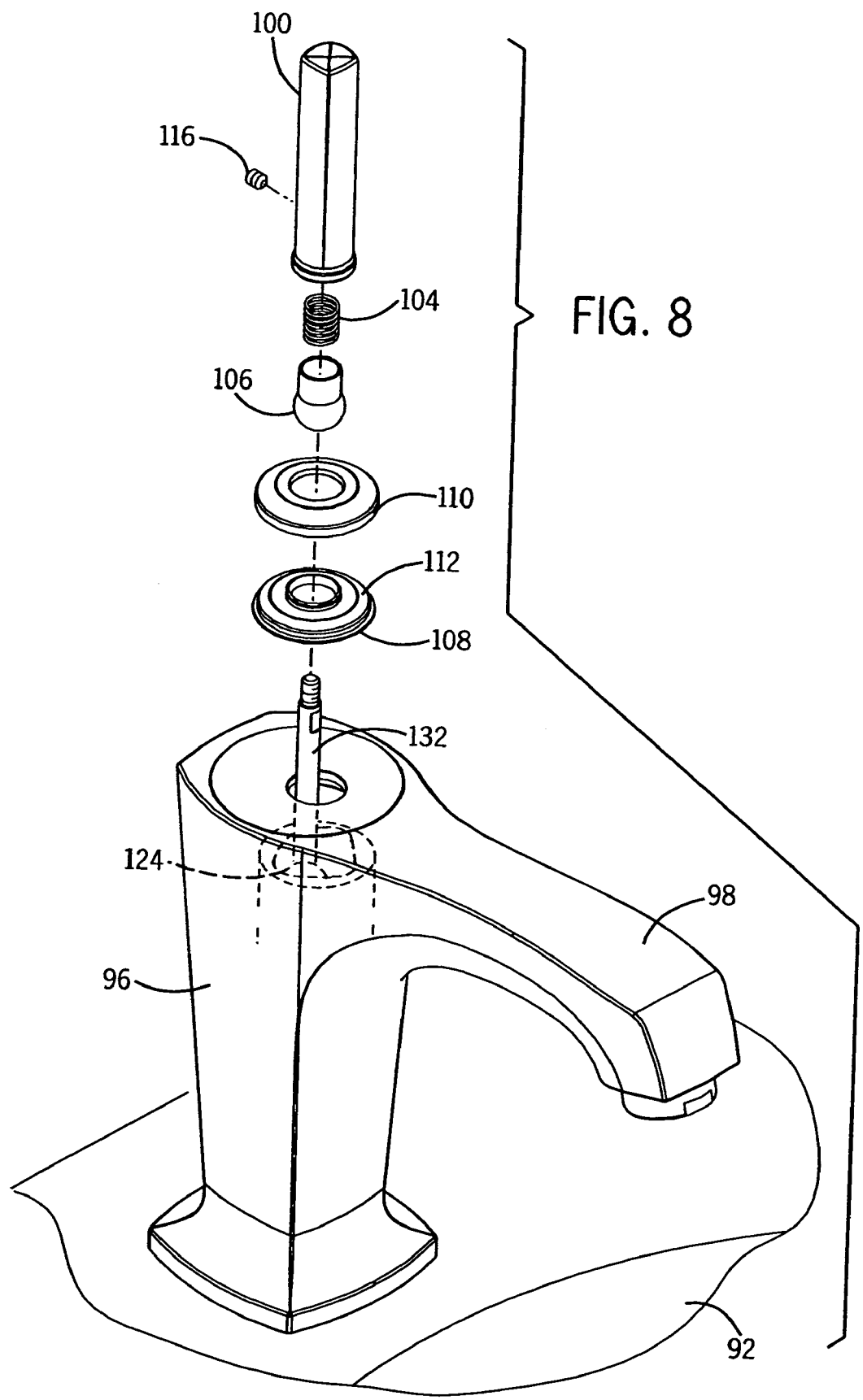
FIG. 8 is an exploded perspective view of the faucet of FIG. 7.
Figure 9:
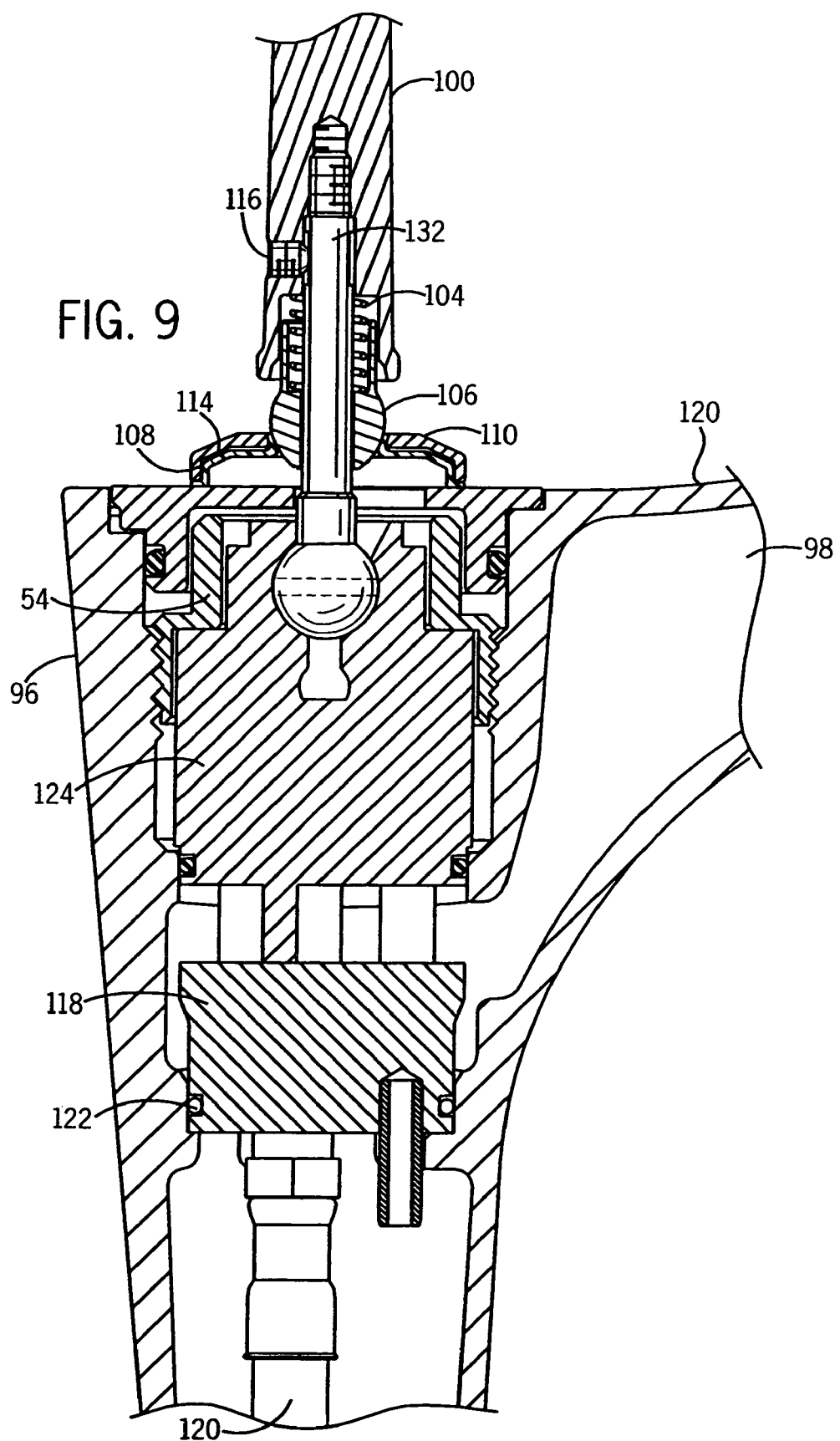
FIG. 9 is a cross-sectional view taken along line 9-9 of FIG. 7.
Figure 10:
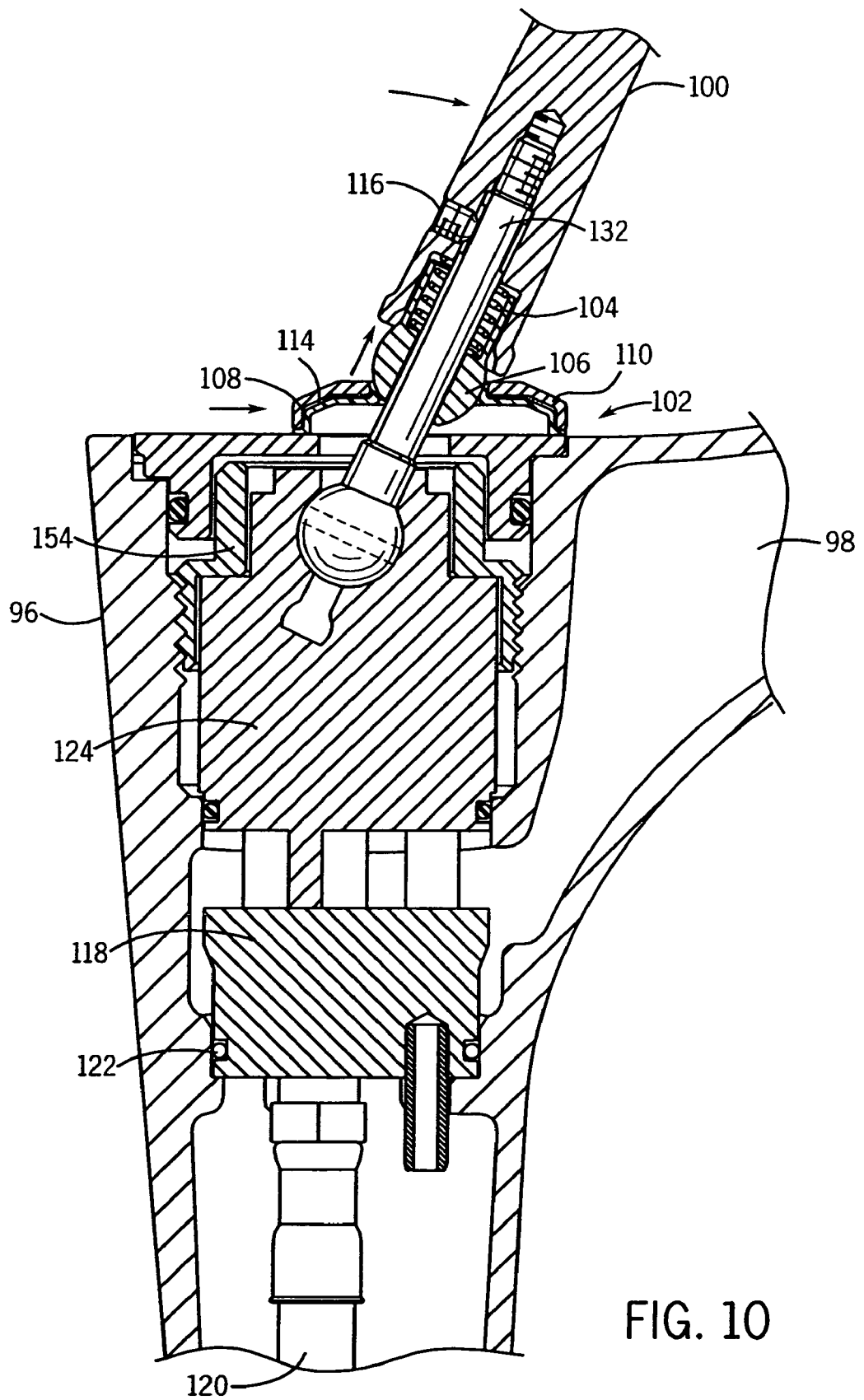
FIG. 10 is a cross-sectional view similar to FIG. 9 but with the faucet handle in a different "on" position.

As best seen in FIG. 6, front 20 can include a mirrored surface 64 and back plate 66, as well as corresponding bracket 68, with shoulder screws 70 and springs 72 which connect to casing 56 to further support faucet 14, and provide stress relief on front 20.

Mixing valve cartridge 24 can include a triangular opening 74, which allows faucet handle 34 to control temperature and flow. As suggested by FIG. 5, it is preferred that the mixing cartridge be such that a central upper stick position will be the off position. As the stick moves forwardly/downwardly, the volume increases. As it moves to the left the temperature of the resulting water increases. As it moves to the right the temperature decreases. Of course, with appropriate selection of a different mixing valve, rotational movement alone, and/or various combinations of pivoting and rotation could control the valve.

Figure 4:
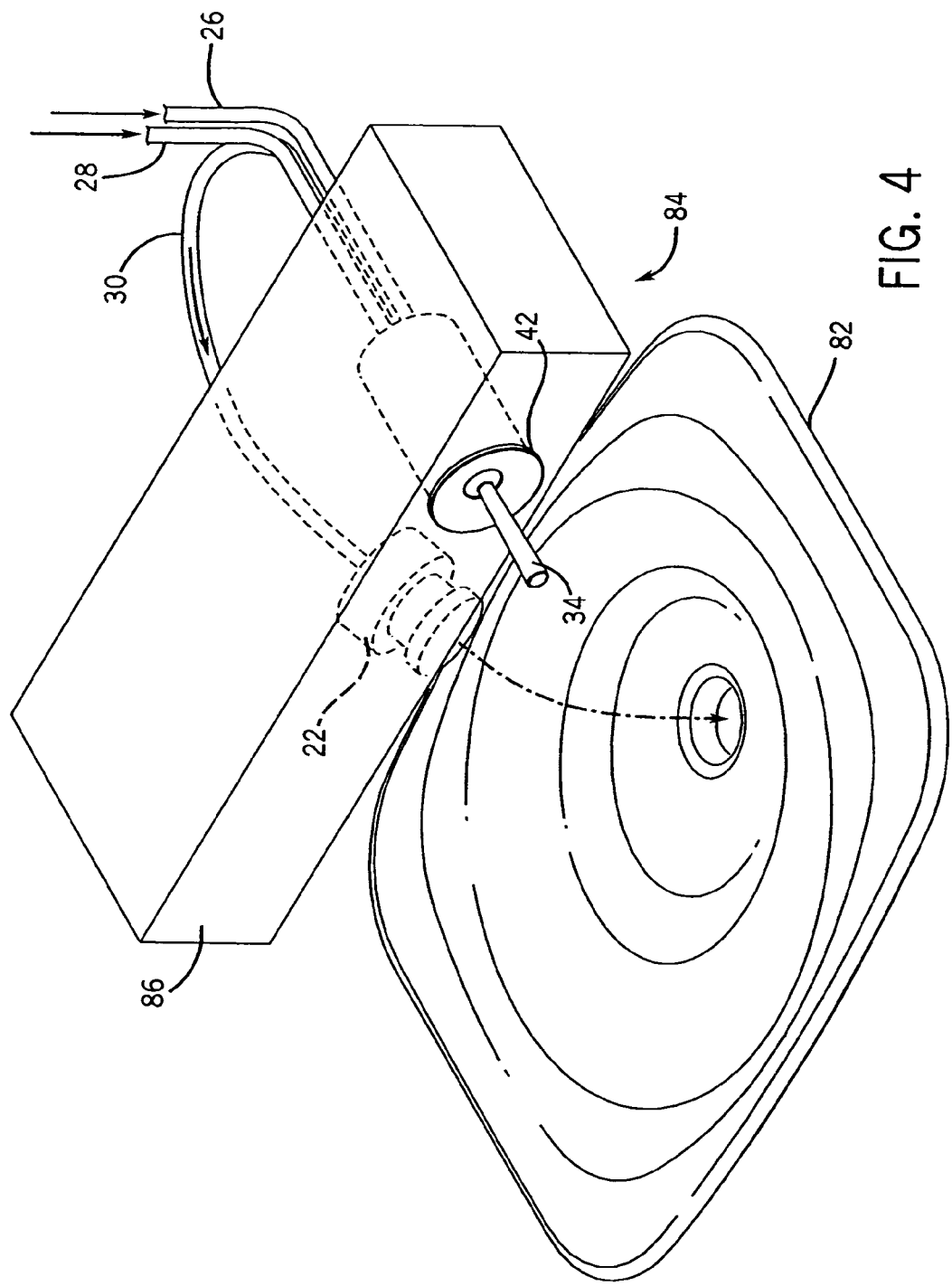
FIG. 4 a view similar to FIG. 1, but with the FIG. 1 cabinet replaced by a different more compact counter top mountable housing.

In the alternative embodiment of FIG. 4 there is sink 82 and faucet 84 in a more compact housing arrangement 86 which is counter mounted. Apart from this, faucet 84 is similar to faucet 14 except that spout 22 here is preferably positioned somewhat differently. Thus, the "box" need not be a medicine cabinet or other large cabinet type structure.

In the embodiment of FIGS. 7-10 there is shown a third stand-alone faucet embodiment. There is a sink 92 and a faucet 94 mounted on the rear of the sink 92.

Faucet 94 has an outer housing 96 and an outlet spout 98. Mixing valve cartridge 124 can be the same as mixing valve cartridge 24 in the other embodiments. A joystick type handle 100 is connected to a stick 132.

Here, instead of the spring biasing the handle away from the lever, biasing element 104 biases a ball 106 against sliding disk 110. Biasing element 104 can be a coil spring as shown, although other resilient members are possible such as leaf springs, spring washers, resilient members comprised of elastomeric materials, or other compressible elements such as a gas diaphragm, and other biasing elements.

There is also a bearing 108 contacting both the ball 106 and the sliding disk 110. Bearing 108 can have an outer surface 112 complementary with an inner surface 114 of sliding disk 110. Bearing 108 can be made of an acetal copolymer, such as Celcon®, which allows bearing 108 to have excellent wear resistance, and have high flexural fatigue strength, toughness and creep resistance. Bearing 108 and sliding disk 110 slidingly engage housing 96 as faucet handle 100 is actuated. Set screw 116 threads into handle 100 and is compressed against stick 132.

Nut 154 is threaded into housing 96. Couplings 118 allows connection between hot and cold inlet lines (120, only one shown) to corresponding ports on bottom of mixing valve cartridge 124. Depending on the position of faucet handle 100, water is discharged out the bottom discharge outlet of mixing valve cartridge 124 and outlet spout 98. O-ring 122 seals the mixed water from leaking out between couplings 118 and outlet spout 98.

Here the resilience is between the handle 100 and the ball 106. This is particularly important as ball 106 holds the sliding disk 110 in place while still permitting easy sliding so as to cover the opening in the valve regardless of position.

While the preferred embodiments of the present invention have been described above and/or depicted in the drawings, the present invention can be further modified within the spirit and scope of this disclosure. Hence, the claims should be looked to in order to judge the full scope of the invention.

INDUSTRIAL APPLICABILITY

The present invention provides faucets having joystick type controls with improved characteristics.

What is claimed is:

1. A faucet, comprising:
   a housing;
   a first inlet port for supplying water to the faucet;
   an outlet port for delivering water from the faucet;
   a control valve suitable to control flow of water from the inlet port to the outlet port;
   a lever linked to the control valve for controlling the control valve;
   a joystick handle linked to the lever so as to permit relative axial movement there between;
   a biasing member positioned outside the housing between the lever and joystick handle so as to resiliently bias the joystick handle away from the control valve;
   wherein the biasing member is positioned in a cavity of the handle; and
   wherein the joystick handle has a domed inward end which rides against a complementary recess on an inward surface of a cover element, and the biasing member is positioned outside the cover element.

2. The faucet of claim 1, wherein there is also a second inlet port for supplying water to the faucet which has a different water temperature than water supplied to the first inlet port, wherein the control valve controls both volume of water delivered out the outlet port, and a mix of water delivered out the outlet port deriving from the first inlet port versus the second inlet port.

3. The faucet of claim 1, wherein said cover element comprises an essentially central aperture which at least part of said domed end extends through.

4. The faucet of claim 1, wherein the lever has an inward end which has a ball.

5. The faucet of claim 1, wherein the faucet is mounted in a box with the joystick handle projecting out a front of the box.

6. The faucet of claim 5, wherein the box is a cabinet having storage shelving.

* * * * *